US006650274B1

United States Patent
Krikorian et al.

(10) Patent No.: US 6,650,274 B1
(45) Date of Patent: Nov. 18, 2003

(54) RADAR IMAGING SYSTEM AND METHOD

(75) Inventors: Kapriel V. Krikorian, Oak Park, CA (US); Robert A. Rosen, Simi Valley, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/160,907

(22) Filed: Jun. 3, 2002

(51) Int. Cl.[7] .......................... G01S 13/90; G01S 13/00
(52) U.S. Cl. ...................... 342/25; 342/175; 342/176; 342/179; 342/190; 342/191; 342/195; 342/88; 356/4.01; 356/5.01; 356/5.03; 356/5.04
(58) Field of Search .......................... 342/25, 73, 74, 342/82–89, 147, 158, 175, 176, 179, 190, 191–197, 59, 75–81, 104, 116, 117; 356/4.01, 5.01, 5.02, 5.08

(56) References Cited

U.S. PATENT DOCUMENTS

| | | | | |
|---|---|---|---|---|
| 4,155,086 A | * | 5/1979 | Blair | 342/25 |
| 4,355,311 A | * | 10/1982 | Frosch et al. | 342/25 |
| 4,866,446 A | * | 9/1989 | Hellsten | 342/25 |
| 4,965,582 A | * | 10/1990 | Hellsten | 342/25 |
| 4,989,008 A | * | 1/1991 | Fujisaka et al. | 342/25 |
| 5,059,966 A | * | 10/1991 | Fujisaka et al. | 342/25 |
| 5,079,555 A | * | 1/1992 | Turpin | 342/25 |
| 5,323,162 A | * | 6/1994 | Fujisaka et al. | 342/25 |
| 5,489,906 A | * | 2/1996 | McCord | 342/25 |
| 5,953,110 A | * | 9/1999 | Burns | 356/5.01 |
| 5,969,662 A | * | 10/1999 | Hellsten | 342/25 |

* cited by examiner

Primary Examiner—Bernarr E. Gregory
(74) Attorney, Agent, or Firm—Leonard A. Alkov; Glenn H. Lenzen, Jr.

(57) ABSTRACT

An imaging system and method. The invention provides an intra-pulse repetition interval (PRI) agile beam technique for enhanced resolution that can be used at aspect angles near the velocity vector of a host vehicle. It is particularly useful at small scan angles where beam sharpening array times become large. At these scan angles, the bandwidth of the clutter is narrower than at higher scan angles and allows large PRIs without degradation from Doppler ambiguities. In accordance with the present teachings, sequential illumination is performed within a PRI to multiple beam locations using an agile beam. The interleaving of beams reduces map formation times compared to conventional techniques using sequential arrays. The inventive system is adapted for use with an electronically scanned (e.g., synthetic aperture array radar) antenna. The inventive method includes the steps of activating the antenna to generate a beam of electromagnetic energy; causing the beam to scan over a predetermined scan volume consisting of a predetermined range of scan angles relative to a reference vector; and generating multiple simultaneous beams of electromagnetic energy over a subset of the predetermined range of scan angles.

20 Claims, 5 Drawing Sheets

RADAR IMAGING SYSTEM AND METHOD

BACKGROUND OF THE INVENTION

1. Field of the Invention

The present invention relates to imaging systems. More specifically, the present invention relates to radar imaging systems.

2. Description of the Related Art

Imaging techniques are well known and widely used in the art. Certain imaging technologies are better suited for particular applications. For example, radar imagery is widely used for surveillance and reconnaissance as well as target tracking and identification. For radar and other imaging technologies, the ability to clearly resolve and discriminate targets may be essential in meeting objectives specified for a particular application.

One such application involves 'real beam ground mapping.' Real beam ground mapping involves scanning an area, e.g., the earth's surface, using a scanning antenna or an electronically scanned antenna. Returns from an illumination of the surface are then examined for 'back-scatter' or reflections therefrom. As the beam is scanned in azimuth, information is collected with respect to the range direction. At each beam position, the distance of various scatterers may be ascertained for each range cell. This information may then be displayed in a real beam ground mapped image.

While range data may be resolved with adequate resolution, currently, resolution of azimuth data with comparable resolution has proved to be problematic. This is due to the fact that azimuth resolution is limited to the width of the antenna beam and the corresponding cross range resolution degrades as a function of range. Accordingly, the poor resolution of conventional real beam mapping systems limits the ability of the system to discriminate scatterers.

Conventional doppler beam sharpening (DBS) or Synthetic Aperture Radar techniques may be used to improve the azimuth resolution, but these require excessive frame times if the coverage includes regions close to the velocity vector.

"Super resolution" techniques are widely used to sharpen the radar imagery. However, the quality achieved is scene dependent and is not robust.

Hence, a need remains in the art for an improved system or method for providing ground mapped images, in a timely manner, that include regions near the velocity vector. Specifically, a need remains in the art for a system or method for providing enhanced cross-range (azimuthal) resolution with a frame time similar to that of a real beam ground mapping radar system.

SUMMARY OF THE INVENTION

The need in the art is addressed by the imaging system and method of the present invention. The inventive system is adapted for use with an electronically scanned (e.g., synthetic aperture array radar) antenna. The inventive method includes the steps of activating the antenna to generate a beam of electromagnetic energy; causing the beam to scan over a predetermined scan volume consisting of a predetermined range of scan angles relative to a reference vector; and generating multiple simultaneous beams of electromagnetic energy over a subset of the predetermined range of scan angles.

In a specific illustrative embodiment, the inventive method further includes the steps of determining azimuth beam positions for the scan volume; computing a dwell time for beam sharpening for each of the azimuth beam positions; computing a maximum pulse repetition interval for each of the beam positions; computing a minimum pulse repetition interval common to all of the beam positions; selecting a pulse repetition interval for each beam position as the greatest multiple of the minimum pulse repetition interval which is less than the maximum pulse repetition interval; interleaving azimuth beam positions within the scan volume which allow for a synchronization of pulses; and generating the multiple beams at the interleaved beam positions in accordance with the dwell times.

Thus the present invention provides an intra-pulse repetition interval (PRI) agile beam technique for enhanced resolution, which can be used at aspect angles near the velocity vector of a host vehicle. At these scan angles, the bandwidth of the clutter is narrower than at higher scan angles and allows large PRIs without degradation from Doppler ambiguities. In accordance with the present teachings, sequential illumination is performed within a PRI to multiple beam locations using an agile beam. The interleaving of beams reduces map formation times compared to conventional techniques using sequential arrays.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
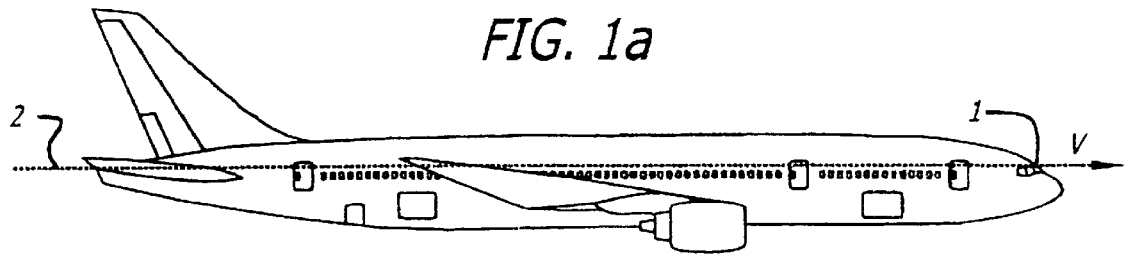
FIG. 1a is a side view of an aircraft and flight provided to illustrate the longitudinal axis and velocity vector thereof.
Figure 1B:
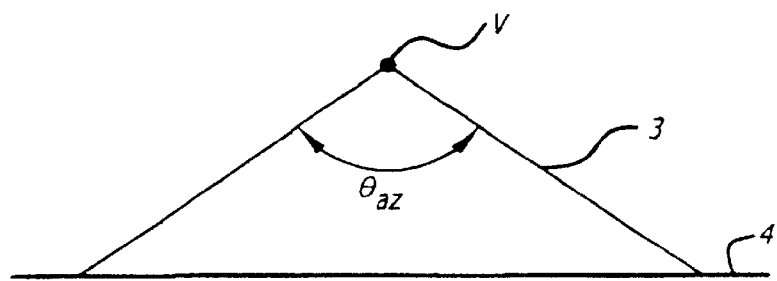
FIG. 1b is an end view of the velocity vector of the aircraft showing an illustrative application of real beam ground mapping in accordance with conventional teachings.
Figure 1C:
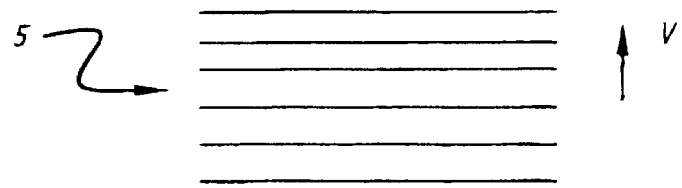
FIG. 1c is a diagram which shows an illustrative beam pattern resulting result from a beam ground scan.

The present invention is adapted for use on a vehicle such as an aircraft moving with a velocity vector such as that shown in FIGS. 1a–c.

FIG. 1a is a side view of an aircraft and flight provided to illustrate the longitudinal axis and velocity vector thereof.

As shown in FIG. 1a, the velocity vector V of the aircraft 1 is coincident with the longitudinal axis 2 thereof.

FIG. 1b is an end view of the velocity vector of the aircraft showing an illustrative application of real beam ground mapping in accordance with conventional teachings. Real beam ground mapping is effected by scanning an antenna beam 3 back and forth in the azimuthal direction around the velocity vector of the vehicle over a surface 4.

FIG. 1c is a diagram which shows an illustrative beam pattern resulting from a beam ground scan. In accordance with the present teachings, azimuthal, cross range resolution is improved by increasing the dwell time of an electronically scanned synthetic aperture array radar antenna during a predetermined portion of the scan thereof. The increase in the dwell time leads to a longer coherent integration time and allows for a sharpening or narrowing of the resolution relative to the antenna beamwidth. Near the velocity vector of the vehicle, e.g., 1–30 degrees off the velocity vector, coherent integration may be used to implement multiple beams. This is made possible by the fact that at angles close to the velocity vector of the vehicle, the clutter bandwidth is narrow. This allows for the use of very low pulse repetition frequencies (PRFs) which is equivalent to very long pulse repetition intervals (PRIs) as PRF=1/PRI. This allows for the creation of multiple simultaneous agile beams and the individual steering of same within the same scanning interval.

Figure 2:
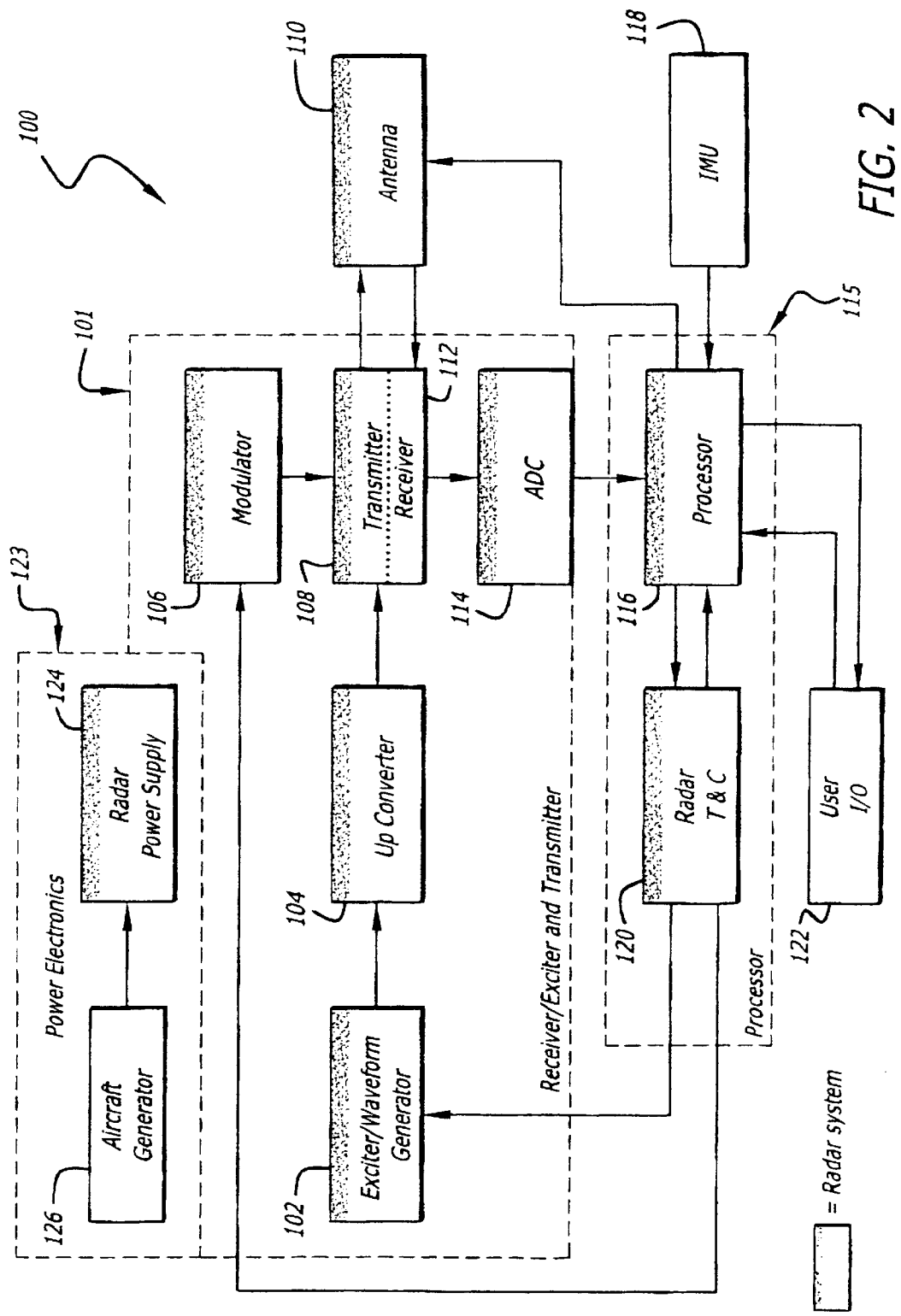
FIG. 2 is a generalized block diagram of a radar system implemented in accordance with the teachings of the present invention.

FIG. 2 is a generalized block diagram of a radar system implemented in accordance with the teachings of the present invention. Those skilled in the art will appreciate that although the present teachings are disclosed with reference to an illustrative radar system implementation, the invention is not limited thereto. The present teachings may be applied to a variety of image processing applications without departing from the scope thereof. The system 100 includes a receiver/exciter and transmitter 101 of conventional design and construction. As is known in the art, the receiver/exciter and transmitter 101 includes an exciter/waveform generator 102 which generates, in response to commands from the processor, a novel and advantageous waveform as discussed more fully below. The radar signal is upconverted by an upconvert stage 104 and filtered, amplified and transmitted by a transmitter stage 108 in response to a signal from a modulator 106. The transmit signal is radiated by an electronically steered radar antenna 110 as a beam of electromagnetic energy.

The antenna beam pointing is also under processor control and, in accordance with the invention, is coordinated with the waveform generator to achieve overlapping beams which provide sharpened resolution without excessive frame times.

In an illustrative real beam ground mapping application, scatter returns of the transmit beam as it is reflected from the ground or other surface are received by the antenna 110 and applied to a radar receiver stage 112.

The receiver 112 amplifies, filters and down converts the scatter return in a conventional manner. The amplified, filtered and down converted scatter returns are digitized by an analog-to-digital converter stage 114 and fed to a processor 116. The processor 116 de-interleaves the pulses of each beam. The processor 116 then coherently combines the pulses within each beam, as in conventional DBS, to obtain a sharpened image.

Figure 3:
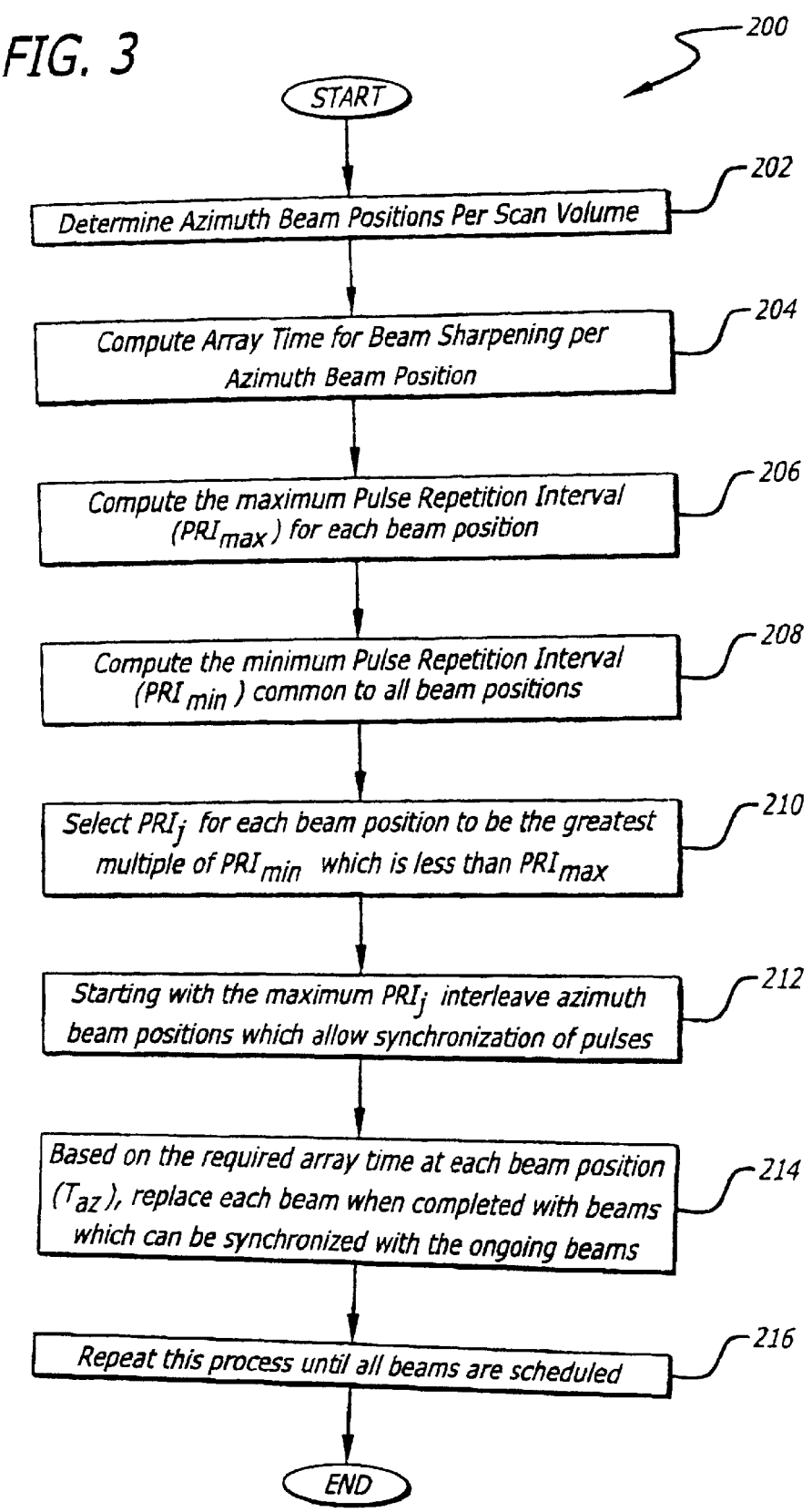
FIG. 3 is a flow diagram showing an illustrative embodiment of a method implemented in accordance with the teachings of the present invention.
Figure 4:
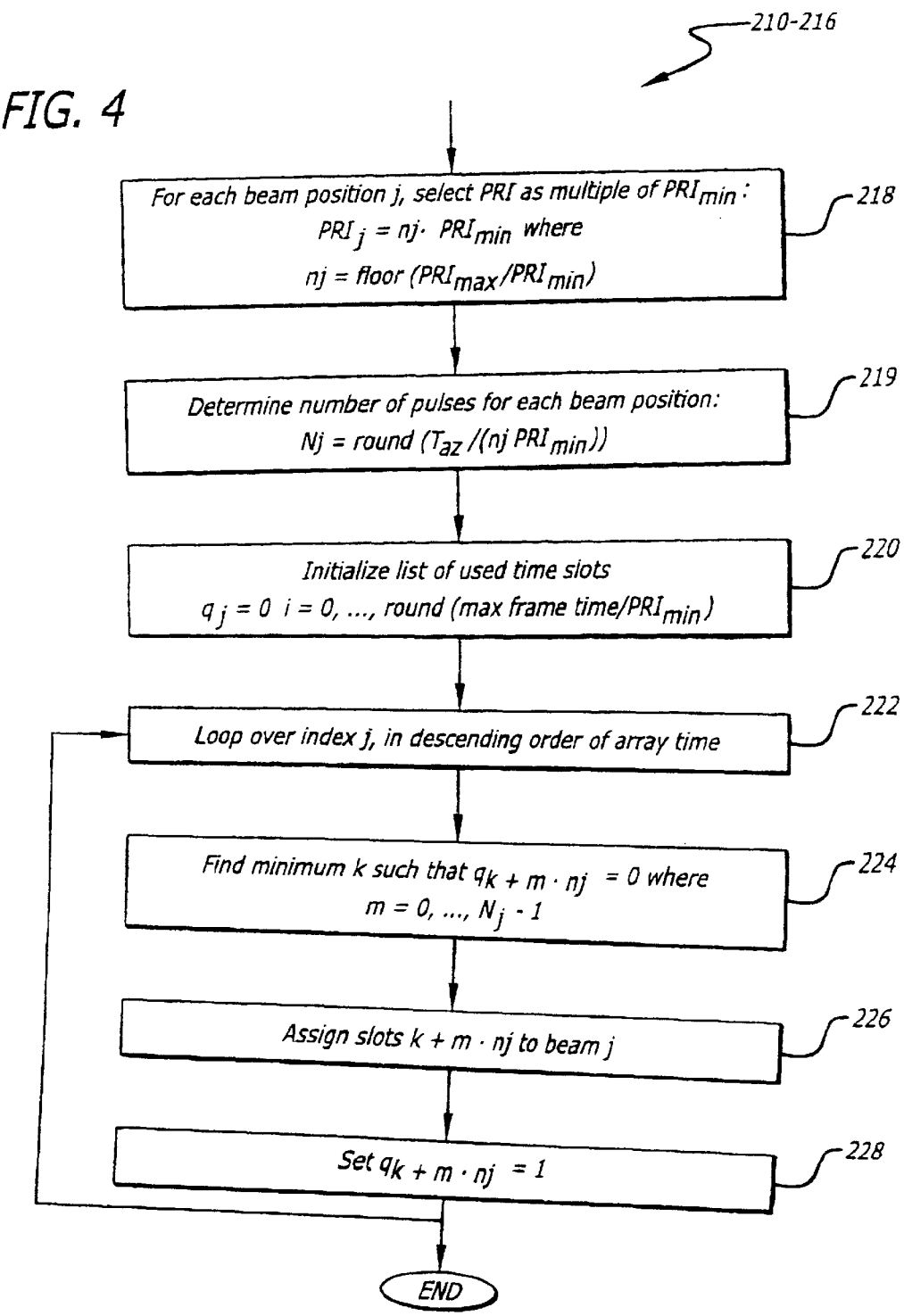
FIG. 4 is a flow diagram that shows an illustrative implementation of certain steps of FIG. 3.

FIGS. 3 and 4 are flow diagrams showing an illustrative embodiment of a method implemented in accordance with the teachings of the present invention. As shown in the FIG. 3, the method 200 includes the step 202 of determining azimuth beam positions for each scan volume. The total number of beam positions is equal to the ratio of the scan range or scan volume to the beamwidth. For example, with a scan range of ±50 degrees the total coverage area is 100 degrees wide. With the beamwidth of 3.5 degrees, the total number of beam positions is 100/3.5=29. Thus, in the illustrative embodiment, at step 202, 29 beam positions are created at intervals of 3.5 degrees from the start of the scan.

Next, at step 204, the system 100 computes the array time for beam sharpening at each azimuth beam position. In accordance with conventional teachings, the array time is computed as follows:

$$T_{az} = \frac{0.6\lambda}{V \sin\theta_{az}\theta_{res}} \tag{1}$$

where $T_{az}$ is the array or dwell time, $\theta_{az}$=azimuth angle from the velocity vector, $\theta_{res}$=desired angular resolution, $\lambda$=wavelength, and V=vehicle velocity. Thus, $T_{az}$ represents the dwell time necessary to achieve a desired (e.g., 20:1) improvement in resolution in the azimuth direction.

Next, at step 206, in accordance with the present teachings, the method 200 computes the maximum pulse repetition interval $PRI_{max}$ for each beam position. Recall that the clutter bandwidth becomes narrower at angles close to the velocity vector. The clutter bandwidth is:

$$B_c = (2v \sin\theta_{az}/\lambda)\theta_{bw} \tag{1a}$$

and this represents the minimum value of the PRF to prevent Doppler foldover. The PRI is the reciprocal of the PRF, so the maximum PRI for each beam position is:

$$PRI_{max} = \frac{\lambda}{2V\sin\theta_{az}\theta_{bw}} \tag{2}$$

where $\theta_{bw}$=3 dB beamwidth.

Next, at step 208, the minimum PRI is computed using the following relation:

$$PRI_{min} = \frac{2R_{max}}{C} + PW + T_s \tag{3}$$

where $R_{max}$=maximum range; PW=radar pulse width (pulse length in the down range direction); C=speed of light; and $T_s$=beam switching time.

Since the clutter width is very narrow for beam positions near the velocity vector, the PRI can be very long near the velocity vector. As discussed above, this allows for the creation of multiple simultaneous interleaved beams in accordance with the teachings of the present invention.

Accordingly, at step 210, a pulse repetition interval for each beam position ($PRI_j$) is selected. In the illustrative embodiment, $PRI_{js}$ is chosen as the greatest multiple of $PRI_{min}$ which is less than $PRI_{max}$. In other words:

$$PRI_{js} = nj \cdot PRI_{min} \tag{4}$$

where $n_j$ is an integer and $nj \cdot PRI_{min} \leq PRI_{max}$.

Figure 5:
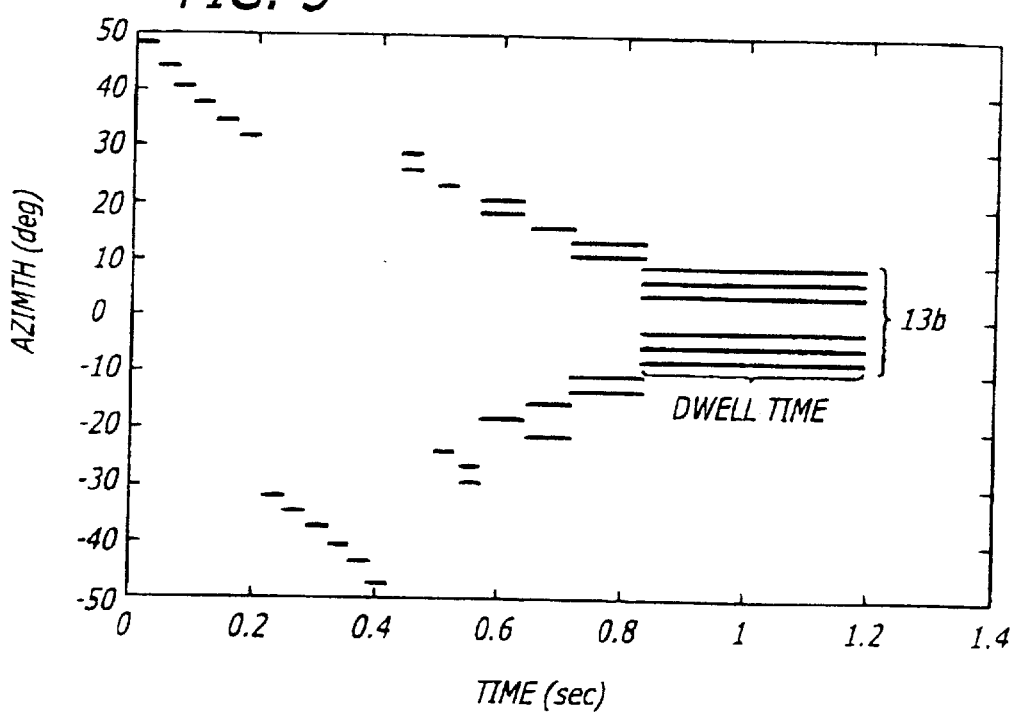
FIG. 5 shows a timeline of illustrative interleaved beams for a wide area mapped in accordance with the teachings of the present invention.

Next, at step 212, starting with the maximum pulse repetition interval at each beam position ($PRI_s$) beam system 100 and method 200 interleaved azimuth beam positions which allow synchronization of pulses (as illustrated in the timeline of FIG. 5 below).

At step 214, based on the required array or dwell time at each beam position ($T_{az}$), the method 200 of the present invention replaces each beam with completed beams which can be synchronized with the ongoing beams. At step 216, this process is repeated until all beams are scheduled.

FIG. 4 is a flow diagram, which shows an illustrative implementation of steps 210 through 216 of FIG. 3. As shown in FIG. 4, at steps 218 and 219, for each beam position 'j', the system selects a pulse repetition interval that is a multiple of $PRI_{min}$:

$$PRI_j = nj \cdot PRI_{min}$$

where:

$$nj = \text{floor } (PRI_{max}/PRI_{min}) \qquad (5)$$

and number of pulses:

$$Nj = \text{round}(T_{az}/(nj\ PRI_{min})) \qquad (6)$$

Note that (the functions "round" and "floor" are commonly used: "round" rounds to the nearest integer, "floor" truncates the fractional part.)

Next, at step 220, the system initializes a list of used time slots as follows: $q_i=0$ where '$q_i$' is a flag indicating whether time slot 'i' has been assigned and i=0, ..., round (max frame time/PRImin). Next, at step 222, the system 100 loops over the index 'j' in descending order of array time. At step 224, the system searches for a minimum value of an index 'k' such that $q_{k+m \cdot nj}=0$ where m=0, ..., $N_j-1$. At step 226, the system assigns slots k+m·nj to beam j. Then, at step 228, the system sets $q_{k+m \cdot nj}=1$ and loops back to step 222 until all the beam positions have been assigned.

FIG. 5 shows a timeline of illustrative interleaved beams for a wide area mapped in accordance with the teachings of the present invention. FIG. 5 shows a scan volume in which pulses are sharpened by integration over a scan range of plus ±50 degrees in azimuth. As is typically the case with prior art systems, at scan angles of ±30 degrees to ±50 degrees in azimuth, the integration times are relatively short. This is due to the fact that the integration time (also referred to herein as the 'dwell time' or 'array time'), represented by the length of each line segment in FIG. 5, is inversely proportional to the sine of the scan angle in azimuth of the beam relative to the velocity vector of the vehicle. Hence, with a scan angle of 90 degrees, the sine value is equal to 1, and this represents the smallest integration time possible for a particular level of resolution. However, as the scan angle approaches the velocity vector e.g. at scan angles between ±30 degrees, the sine function diminishes and the integration time increases to achieve the desired resolution. As illustrated in FIG. 5, at very small scan angles, e.g., between ±5 degrees, the integration time becomes substantially longer. At these angles, the clutter bandwidth is narrower allowing for a lower PRF. The lower PRFs are equivalent to longer PRIs.

In accordance with the present teachings, during these longer pulse repetition intervals, additional overlapping beams are generated as illustrated at scan angles between ±30 degrees in FIG. 5. Thus, as illustrated in FIG. 5, in the illustrative embodiment of the present teachings, at azimuth angles between ±10 degrees, six beams 136 are generated simultaneously. With conventional coherent integration techniques, these beams may be sharpened with a ratio as high as 20:1. Note that notwithstanding the generation of multiple beams, where the dwell times are longer, the total time to cover the entire scan volume (±50 degrees in azimuth) has not increased. On the contrary, were it not for the generation of multiple overlapping beams, it would not be possible to complete the entire scan volume within the 1.2 second timeframe illustrated in FIG. 5.

Figure 6:
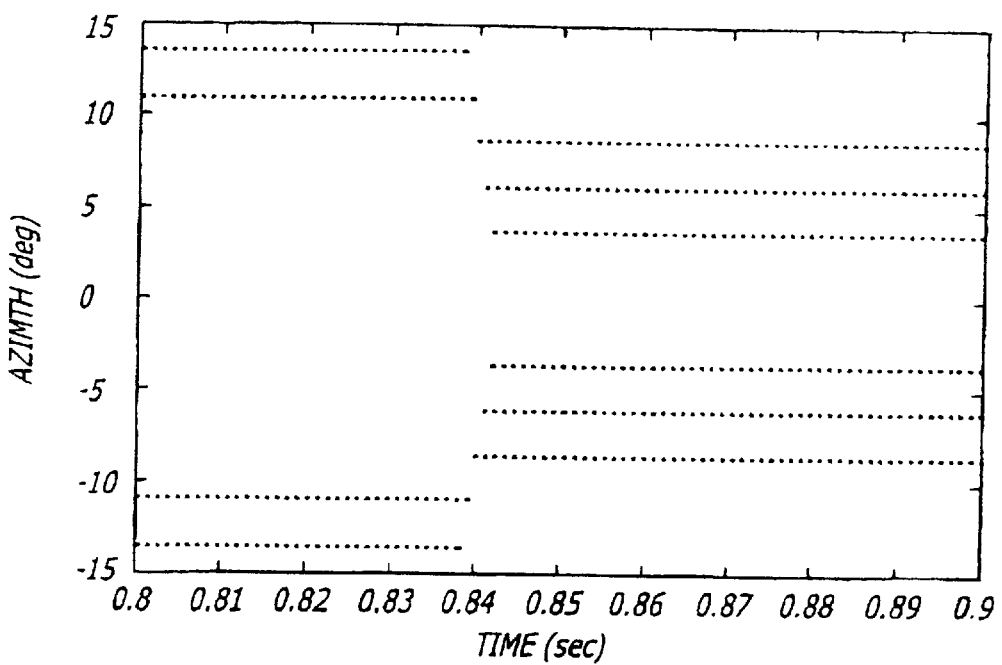
FIG. 6 is a diagram that shows a magnifying the view of the scan of FIG. 5 at small scan angles.

FIG. 6 is a diagram that shows a magnified view of the scan of FIG. 5 at small scan angles. As illustrated in FIG. 6, each beam line is created by a series of pulses.

The intra-pulse repetition interval (PRI) agile beam technique for enhanced resolution of the illustrative embodiment of the present invention can be used at aspect angles excluding a section of ±3.5 degrees near the velocity vector of the vehicle. It is particularly useful at small scan angles (e.g., 3.5 degrees to 25 degrees) where beam sharpening array times become large. At these scan angles, the bandwidth of the clutter is narrower than at higher scan angles and allows large PRIs without degradation from Doppler ambiguities. Thus, an agile beam allows interleaving of pulses from multiple beams. In accordance with the present teachings, sequential illumination is performed within a PRI to multiple beam locations using the agile beam. The interleaving of beams reduces map formation times compared to conventional techniques using sequential arrays. For example, utilizing the present teachings, a beam scan over a range of ±50 degrees may be achieved within 1.2 seconds with a 20:1 beam sharpening ratio using the timeline shown in FIGS. 5 and 6 herein. Beam switching times of 10 microseconds are assumed with register controlled beams (i.e., flicker mode).

Thus, the present invention has been described herein with reference to a particular embodiment for a particular application. Those having ordinary skill in the art and access to the present teachings will recognize additional modification applications and embodiments within the scope thereof.

It is therefore intended by the appended claims to cover any and all such applications, modifications and embodiments within the scope of the present invention.

Accordingly,

What is claimed is:

1. An imaging system comprising:
   first means for generating a beam of electromagnetic energy;
   second means for causing the first means to scan the beam over a predetermined scan volume consisting of-a predetermined range of scan angles relative to a reference vector; and
   third means for causing the first means to generate multiple simultaneous beams of electromagnetic energy over a subset of the predetermined range of scan angles.

2. The invention of claim 1 wherein the first means includes an electronically scanned antenna.

3. The invention of claim 1 wherein the second means includes a processor.

4. The invention of claim 3 wherein the processor includes a radar timing and control circuit.

5. The invention of claim 1 wherein the third means includes means for determining azimuth beam positions for the scan volume.

6. The invention of claim 5 wherein the third means further includes means for computing a dwell time for beam sharpening for each of the azimuth beam positions.

7. The invention of claim 6 wherein the third means further includes means for computing a maximum pulse repetition interval for each of the beam positions.

8. The invention of claim 7 wherein the third means further includes means for computing a minimum pulse repetition interval common to all of the beam positions.

9. The invention of claim 8 wherein the third means further includes means for selecting a pulse repetition interval for each beam position as the greatest multiple of the minimum pulse repetition interval which is less than the maximum pulse repetition interval.

10. The invention of claim 9 wherein the third means further includes means for interleaving azimuth beam positions within the scan volume, which allow for a synchronization of pulses.

11. The invention of claim 10 wherein the third means further includes means for generating the multiple beams at the interleaved beam positions in accordance with the dwell times.

12. A radar system comprising:
  a synthetic aperture array antenna;
  a radar timing and control system coupled to the array antenna;
  a processor coupled to the radar timing and control system; and
  software running on the processor effective to cause the processor to generate signals to the antenna via the radar timing and control system to cause the antenna to scan a beam of electromagnetic energy over a-predetermined scan volume consisting of a predetermined range of scan angles relative to a reference vector and for causing the antenna to generate multiple simultaneous beams of electromagnetic energy over a subset of the predetermined range of scan angles.

13. An imaging method including the steps of:
  generating a beam of electromagnetic energy;
  causing the beam to scan over a predetermined scan volume consisting of a predetermined range of scan angles relative to a reference vector; and
  generating multiple simultaneous beams of electromagnetic energy over a subset of the predetermined range of scan angles.

14. The invention of claim 13 wherein the generating step includes the step of determining azimuth beam positions for the scan volume.

15. The invention of claim 14 wherein the generating step includes the step of computing a dwell time for beam sharpening for each of the azimuth beam positions.

16. The invention of claim 15 wherein the generating step includes the step of computing a maximum pulse repetition interval for each of the beam positions.

17. The invention of claim 16 wherein the generating step includes the step of computing a minimum pulse repetition interval common to all of the beam positions.

18. The invention of claim 17 wherein the generating step includes the step of selecting a pulse repetition interval for each beam position as the greatest multiple of the minimum pulse repetition interval which is less than the maximum pulse repetition interval.

19. The invention of claim 18 wherein the generating step includes the step of interleaving azimuth beam positions within the scan volume which allow for a synchronization of pulses.

20. The invention of claim 19 wherein the generating step includes the step of generating the multiple beams at the interleaved beam positions in accordance with the dwell times.

* * * * *